April 22, 1952  S. P. NEMETH  2,594,060
MOTOR DRIVE FOR BICYCLES
Filed Oct. 6, 1949
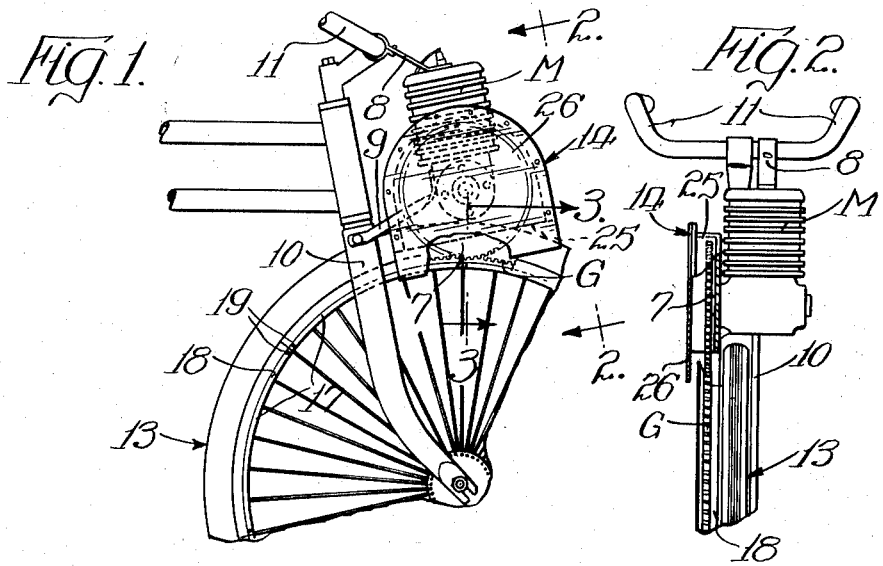
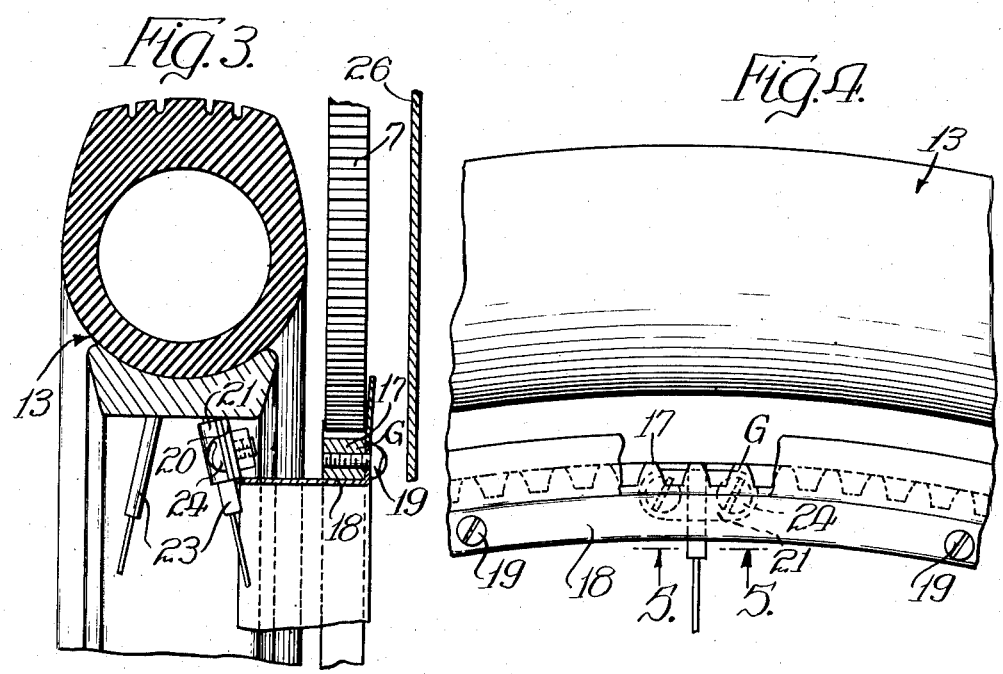
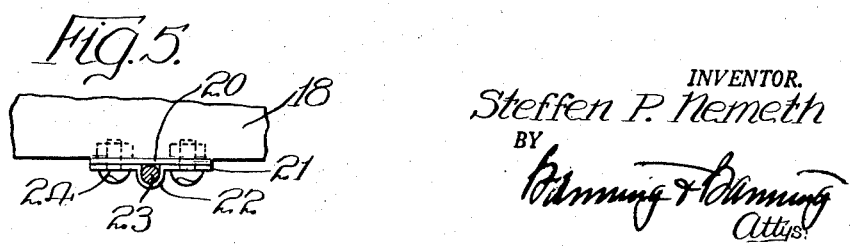
INVENTOR.
Steffen P. Nemeth
BY
Banning & Banning
Attys Patented Apr. 22, 1952

2,594,060

UNITED STATES PATENT OFFICE 2,594,060

MOTOR DRIVE FOR BICYCLES

Steffen P. Nemeth, Chicago, Ill.

Application October 6, 1949, Serial No. 119,901

2 Claims. (Cl. 180—33)

The main objects of this invention are to provide an improved form of motor-drive for bicycles; to provide an improved motor-drive for bicycles which permits the motor to be mounted, if desired, on the front wheel fork so as to apply the power of the motor to the front wheel of the bicycle; to provide an improved form and manner of mounting the driven gear on either wheel of a bicycle; to provide an improved form of motor-supported guard for the gearing; and to provide an improved motor-drive of this kind which is guarded, economical to manufacture, extremely easy to mount on a bicycle and remove therefrom, and highly efficient in use.

In the accompanying drawings:

Figure 1 is a side elevation of the front end of a bicycle showing mounted thereon an improved front-wheel motor-drive constructed in accordance with this invention;

Fig. 2 which is a front elevation thereof, shows the manner in which a guard is provided for the gearing;

Fig. 3 is an enlarged, fragmentary detail in cross-section, taken on line 3—3 of Fig. 1, showing the form and manner of mounting the driven gear on the spokes of one of the bicycle wheels;

Fig. 4 is a further enlarged fragmentary side elevational view of one of the ring gear segments secured to its supporting angle-plate segment upon the spokes of a bicycle wheel; and Fig. 5 is a fragmentary detail in section, taken on line 5—5 of Fig. 4.

The present wheel motor-drive comprises a motor M mounting a driving gear 7 and attachable to the frame of a bicycle proximate to either of its wheels. As shown, brackets 8 and 9 extending from the front-wheel fork 10 and handle bars 11 fixedly support the motor so as to mesh its driving gear 7 with a driven gear G clamped to the front bicycle wheel 13. A suitable guard 14 attached to the motor encloses the gear 7 and its meshing relationship with the driven gear G.

The motor M may be of any conventional type gasoline motor. The gear 7 preferably would be provided with a suitable form of overrun clutch so as to permit coasting or idling of the bicycle when desired.

The driven gear G is in the form of a ring made up of a plurality of arcuate segments 17 each secured to a supporting angle-shaped arcuate segment 18 as by screws 19. The supporting segments 18 have ears 20 formed at points along the inner periphery of the bottom of the segment, these ears being extended outwardly and upwardly. Clips 21, embossed as shown at 22, fit over the spoke nipples 23, and are secured to the ears 20 by nuts and bolts 24 so as to clamp the segments 18 to the spoke nipples 23 with the ends of the gear segments 17 abutting so as to form the driving gear G on the bicycle wheel 13 which is to be driven. The attachment of the segments 18 may be to every second spoke nipple 23, and is so made that the ears 20 abut the inner periphery of the rim of the wheel 13. This abutting of the gear segments 17 end to end and the diametrically-opposite contact of the ears 20 with the inner periphery of the rim results in having the thrust of the driving gear 7 on any one driven gear segment 17 transmitted to the abutting gear segments 17 and to the segment diametrically opposite.

The guard 14 may be of any suitable construction. It is herein shown to consist of two pieces, an inner flanged plate 25 and an outer plate 26. The flanged plate 25 is secured to the housing of the motor M inwardly of the driving gear 7. The outer plate 26 is secured by screws to the flange on the plate 25 so as to extend down over and enclose a driving gear 7 and its meshing contact with the driven gear G.

A small tank for gasoline, a battery, and controls for the operation of the motor (none of which are herein shown) are, of course, provided and may be suitably arranged and supported on the handle bars 11.

A feature of the present drive is the sectional character of the ring gear which adapts it for mounting upon the wheel of a bicycle and inwardly of its frame. Each section of segmental shape is carried by a supporting segment which optionally may be of the same arcuate length. The one may be preassembled with the other, or the supporting segments may be installed first. When clamped to the wheel spokes and engaged with its rim each segment will be perfectly centered to produce a true ring. This applies both to the supporting and gear segments.

The gear construction herein disclosed is one that is light and inexpensive to build. The efficiency of the power drive through a ring gear of the kind under description is very high. It is, therefore, highly suited to a light weight bicycle equipped with a fractional horsepower motor having a weight of but very few pounds.

Variations and modifications in the details of the structure and arrangement may be resorted to within the spirit and coverage of the appended claims.

I claim:

1. A bicycle motor-drive comprising a driving gear mounted on the bicycle to rotate about a horizontal axis and positioned laterally of one of the bicycle wheels adjacent its rim, a sectional driven gear composed of a plurality of arcuate gear segments arranged at one side of said bicycle wheel in spaced relation to the outer portions of the spokes thereof, a plurality of co-extensive arcuate supporting segments angle-shaped in cross section and extending laterally from the bicycle wheel, outwardly disposed ears formed on the inner perimeter of the angle-shaped segments contiguous to spokes of the wheel and in abutment with the rim thereof, and a clip coacting with each of said ears and clamping said angle-shaped segments to spokes of said wheel, the outer portions of the angle-shaped segments being secured to the gear segments and supporting the same in their spaced relation with the bicycle wheel and maintaining the gear segments in meshing engagement with the driving gear and extended beyond said gear segments and arranged in overlapping relation to the driving gear.

2. A bicycle motor-drive comprising, in combination with a motor, a driving gear mounted on the bicycle to rotate about a horizontal axis and positioned laterally of one of the bicycle wheels adjacent its rim, a sectional driven gear composed of a plurality of arcuate gear segments arranged at one side of said bicycle wheel in spaced relation to the outer portions of the spokes thereof, a plurality of co-extensive arcuate supporting segments angle-shaped in cross section and extending laterally from the bicycle wheel, outwardly disposed ears formed on the inner perimeter of the angle-shaped segments contiguous to spokes of the wheel and in abutment with the rim thereof, a clip coacting with each of said ears and clamping said angle-shaped segments to spokes of said wheel, the outer portions of the angle-shaped segments being secured to the gear segments and supporting the same in their spaced relation with the bicycle wheel and maintaining the gear segments in meshing engagement with the driving gear and extended beyond said gear segments and arranged in overlapping relation to the driving gear, and a guard plate carried by the motor and depending therefrom and arranged in overlapping relation with said outer extended portions of the angle-shaped segments.

STEFFEN P. NEMETH.

REFERENCES CITED

The following references are of record in the file of this patent:

UNITED STATES PATENTS

| Number | Name | Date |
|---|---|---|
| 1,067,700 | Wessoleck | July 15, 1913 |
| 1,700,143 | Sherman | Jan. 29, 1929 |

FOREIGN PATENTS

| Number | Country | Date |
|---|---|---|
| 116,307 | Great Britain | June 5, 1918 |
| 150,653 | Austria | Sept. 25, 1937 |
| 152,013 | Great Britain | Dec. 22, 1921 |
| 208,117 | Switzerland | Apr. 1, 1940 |